United States Patent [19]

Bouchard et al.

[11] 4,424,020
[45] Jan. 3, 1984

[54] MINIATURE PHOTOFLASH UNIT USING SUBMINIATURE FLASH LAMPS

[75] Inventors: Andre C. Bouchard, Peabody; George J. English, Reading; Harold H. Hall, Jr., Marblehead; John A. Scholz, Danvers, all of Mass.

[73] Assignee: GTE Products Corporation, Stamford, Conn.

[21] Appl. No.: 262,008

[22] Filed: May 8, 1981

[51] Int. Cl.³ .............................................. F21K 5/02
[52] U.S. Cl. ..................................... 431/359; 431/365; 431/362; 313/285; 313/238; 362/6; 362/11; 362/13
[58] Field of Search ............... 431/359, 364, 365, 360, 431/362; 362/13, 11, 3, 6; 313/238, 285

[56] References Cited

U.S. PATENT DOCUMENTS

| | | | |
|---|---|---|---|
| 3,857,667 | 12/1974 | Vetere et al. | 240/1.3 |
| 4,017,728 | 4/1977 | Audesse et al. | 431/359 X |
| 4,164,007 | 8/1979 | Audesse et al. | 362/13 |
| 4,245,280 | 1/1981 | Hartman | 431/365 X |
| 4,249,230 | 2/1981 | Colville et al. | 431/359 X |
| 4,306,855 | 12/1981 | Brower et al. | 431/359 |
| 4,336,570 | 6/1982 | Brower et al. | 431/359 X |
| 4,375,953 | 3/1983 | Bouchard et al. | 431/359 |

*Primary Examiner*—Samuel Scott
*Assistant Examiner*—Randall L. Green
*Attorney, Agent, or Firm*—Lawrence R. Fraley

[57] ABSTRACT

An electrically-activated, miniature photoflash unit which includes a plurality (e.g., ten) of subminiature high voltage flash lamps arranged in a planar array. A singular mounting tab protrudes from the unit's housing and serves to connect the entire array when the tab is electrically connected to a power source (e.g., piezoelectric crystal) typically associated with many of today's cameras. Each of the lamps is inverted with respect to the tab and also serve to provide a low resistance circuit path therethrough subsequent to activation thereof.

17 Claims, 7 Drawing Figures

MINIATURE PHOTOFLASH UNIT USING SUBMINIATURE FLASH LAMPS

TECHNICAL FIELD

The invention relates to multilamp photoflash units and particularly to such units which are electrically activated. Even more particularly, the invention relates to units of the variety described which are capable of being attached to or inserted within many of today's cameras for being activated by the power source typically associated with such cameras.

BACKGROUND

The present invention represents a unique concept in the field of electrically-activated multilamp photoflash units. As will be described, the photoflash unit of the invention is capable of providing as many or more total flashes per unit as available from most products available today in a compact, miniaturized package possessing a total volume equal to only a fraction of such products. In addition, the invention is capable of operating with greater efficiency than existing units by providing significantly greater levels of lamp output per package volume allocated for each lamp than said currently sold products.

Typical examples of electrically-activated units on today's market are described and illustrated in U.S. Pat. Nos. 3,857,667 (Vetere et al), 4,017,728 (Audesse et al), and 4,164,007 (Audesse et al). The product illustrated in 3,857,667 is commonly referred to in the industry as a "flash bar" and includes two opposing linear arrays of electrically-activated lamps encased in a plastic housing. Subsequent to flashing of the lamps in one linear array, the device must be reversed and the remaining lamps then connected for firing. The "flash bars" available today typically possess a width (length) in excess of four inches, a height of about one and one-half inch, and a thickness (or depth) of about one-half inch. The unit in 4,017,728 is popularly referred to in the industry as a "flip-flash" and contains a total of eight high voltage flash lamps arranged in a vertically oriented planar array with connecting devices at opposite ends of the unit's plastic housing. The device must be inverted to assure ignition of all lamps therein. The "flip-flash" typically has an overall length in excess of five inches, a width in excess of one and one-half inch, and a thickness (depth) of above one-half inch. The multilamp unit described in U.S. Pat. No. 4,164,007 constitutes a more recent version of the "flip-flash" products, providing a total of ten lamps in a package possessing similar exterior dimensions to those above. This unit must also be inverted to achieve ignition of the entire array of lamps.

While it is known in the art that the above multilamp devices operate with a relatively high degree of reliability, it is understood that due to the relatively large size (total volume) of each device, carrying of several such units may prove somewhat cumbersome and inconvenient to the average photographer. In addition, the requirement that such devices be of the sizes mentioned above and heretofore deemed necessary in turn necessitates the utilization of correspondingly large quantities of material to produce same, thus adding to manufacturing costs thereof.

It is believed, therefore, that a multilamp photoflash unit which is extremely small in total external volume in comparison to existing such devices and also capable of providing at least an equal number of intense flashes per unit would constitute a significant advancement in the art.

It is also believed that such a unit which is capable of sequentially igniting all of the lamps therein without the need for inverting or reversing the unit, as heretofore required in prior art units such as those defined above, would constitute an art advancement. Several additional notably advantageous features provided by the instant invention over the present art, including the provision of significantly greater levels of lamp illumination per package volume allocated for each lamp, are described below and also deemed supportive of the intention that the invention represents a truly significant advancement in the current state of the art.

DISCLOSURE OF THE INVENTION

It is therefore a primary object of the present invention to provide a multilamp photoflash unit which is electrically-activated and possesses a total volume constituting only a fraction of the volume of the above-described multilamp units currently available today and yet is still able to provide at least an equal number of total flashes.

It is another object of the invention to provide such a unit wherein the lamp output per package volume allocated for each lamp is significantly greater than the above units, thus providing a unit which operates in a more efficient manner.

It is yet another object of the invention to provide such a unit wherein all of the unit's lamps are capable of being ignited in a sequential manner without the need for repositioning of the unit with respect to the camera with which it is to be utilized.

It is an even further object of the invention to provide a unit as described above which can be manufactured at significantly less cost than units available today.

In accordance with a main aspect of the present invention, there is provided a miniature photoflash unit which is capable of being electrically activated when connected to the power source typically associated with many of today's cameras. The unit comprises a small, substantially planar housing which includes an insulative base and a light-transmitting cover secured thereto or forming a part of the base, lamp-firing circuitry located within the housing and on a first surface of the housing's base, a plurality of subminiature flash lamps secured to the base and connected to the circuitry, the lamps being located within the housing in a substantially planar array adjacent said first surface of the base and arranged to occupy first and second separate regions within said array, and a singular mounting device which electrically connects the unit to the camera's power source for providing the unit's circuitry with ignition pulses provided by the power source in order to effect selective ignition of the flash lamps in response to receipt of said pulses from the power source. The described lamp-firing circuitry is capable of selectively igniting all of the flash lamps in both of the described regions within the unit.

BEST MODE FOR CARRYING OUT THE INVENTION

For a better understanding of the present invention together with other and further objects, advantages and capabilities thereof, reference is made to the following disclosure and appended claims in connection with the abovedescribed drawings.

Figure 1:
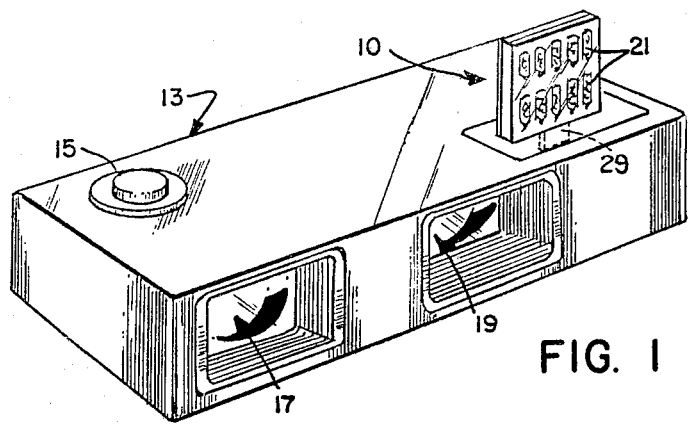
FIG. 1 is a perspective view of a miniature photoflash unit in accordance with the preferred teachings of the invention as positioned on a typical pocket-type camera available on the market today.

With particular reference to FIG. 1, there is shown a miniature photoflash unit 10 in accordance with a preferred embodiment of the invention as positioned atop a typical pocket camera 13 available on the market today. One example of such a camera is "EKTRA 2" available from the Eastman Kodak Company, Rochester, N.Y. This camera possess a shutter release button 15, a viewfinder 17, and a lens 19 arranged substantially in the manner illustrated in FIG. 1. In addition, pocket cameras of this type also include a socket (not shown) for accepting the aforementioned "flip-flash" multilamp units available today. Accordingly, the camera includes a power source therein for providing high voltage, low energy pulses to the socket and thus to the connecting device of the photoflash unit inserted therein. One example of a power source typically associated with many of the cameras available today is a piezoelectric element or crystal which provides a pulse approaching approximately 3,000 volts upon mechanical actuation thereof. As will be described, unit 10 includes a tubular mounting device (29) which is capable of insertion within the aforedescribed socket to assure connection of unit 10 to the described power source. With this mounting device inserted within the socket, unit 10 will assume the position illustrated in FIG. 1.

As shown in FIG. 1, unit 10 is of a substantially planar configuration and includes a plurality of individual subminiature flash lamps 21 therein. As will be described below, each of these lamps is inverted with respect to the unit's tabular mounting device and therefore with respect to the camera itself. A total of ten lamps 21 is shown, with five of said lamps being arranged in a linear pattern above a correspondingly similar number also within a linear pattern immediately therebelow. The unit is thus capable of providing a total of ten individual flashes of relatively high intensity in response to receipt of a similar number of the described high energy pulses from the camera's inboard power source.

Figure 2:
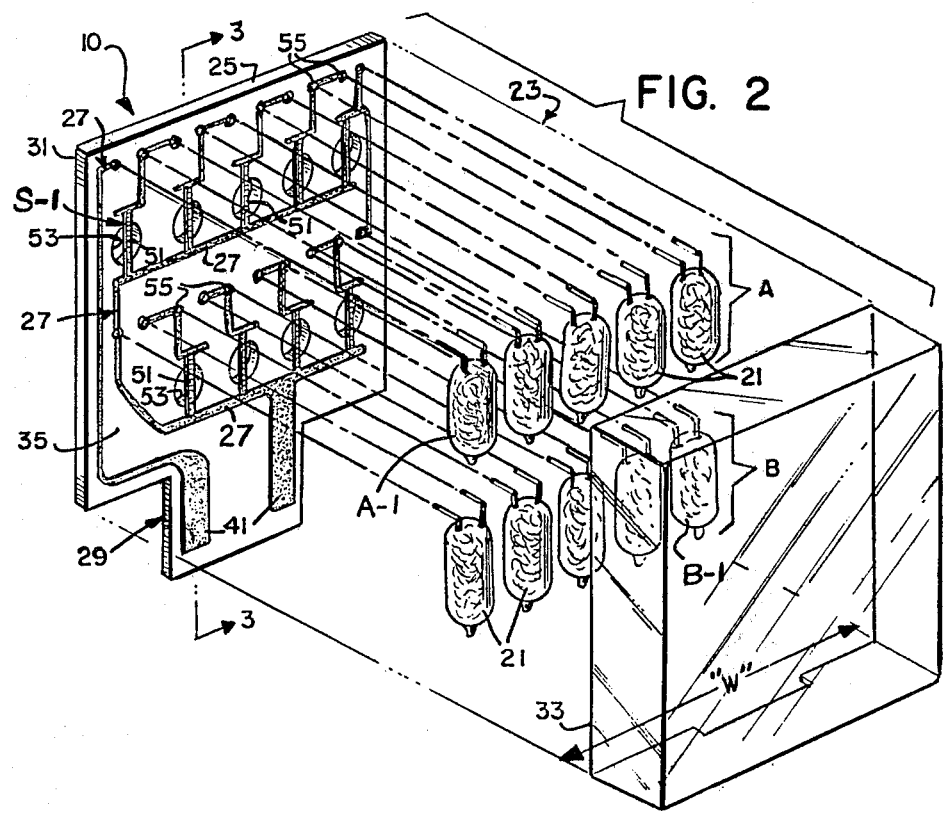
FIG. 2 is a much enlarged, exploded perspective view of the photoflash unit of FIG. 1 illustrating the components as utilized therein and their respective positions within the unit.

In FIG. 2, there is provided an enlarged, exploded perspective view of the photoflash unit 10 shown in FIG. 1. Unit 10 comprises a small twopiece, substantially planar housing 23, lamp-firing circuitry 27 positioned on a planar surface on one part of housing 23, the aforementioned several subminiature, electrically-activated flash lamps 21, and a tabular mounting device 29 which is secured to or forms a part of housing 23. Housing 23 is of a very small, substantially planar configuration and includes a base member 31 (also planar) and a boxlike cover 33 which is secured to base 31 to encase the unit's lamps and circuitry components (see FIG. 3). Both the base and cover are of electrically insulative material and are preferably comprised of a suitable plastic, e.g. polystyrene. As stated, housing 23 is extremely small in comparison to the housing typically associated with the aforedescribed "flip-flash" and "flash bar" photoflash devices. By way of specific example, the assembled unit 10 possesses an overall height (dimension "h" in FIG. 3) of only about 1.50 inch, a width (dimension "w" in FIG. 2) of only about 1.00 inch, and a thickness or depth (dimension "t" in FIG. 3) of less than 0.375 inch. Boxlike light-transmitting cover 33 possesses a height (dimension "$h_1$" in FIG. 3) of about 1.00 inch. Accordingly, the tabular device 29 extends only about 0.50 inch. The total thickness of base 31 is less than about 0.060 inch. The completely assembled unit depicted in FIG. 3 possesses a total package volume of only about 0.25 to about 0.38 cubic inches.

As stated, located on a planar surface of base 31 is the lamp-firing circuitry 27 which functions to selectively ignite the unit's several flash lamps 21. In preferred form, circuitry 27 is die-stamped on the surface (35) to assure high resolution (precisioned alignment in a close pattern) of the circuit. It is also understood that circuit 27 can be applied using another technique, e.g., silk-screening, and the aforementioned die-stamping procedure is thus not meant to limit the invention. In the event that circuit 27 is die-stamped, each of the circuit runs would preferably be comprised of aluminum or a similar metallic material adapted for die-stamping. The lamps of the invention are electrically connected in a series arrangement such that those in the upper or first region (A) are flashed first and then those in the lower region (B) are fired. As illustrated, each of the lamps is positioned in an inverted manner with respect to the tabular device 29. In operation, when the unit 10 is inserted within the respective socket of camera 13, the aforedefined high voltage pulses are applied to a pair of conductive terminals 41 located on one surface of tab 29. Terminals 41 are shown as being electrically connected to circuitry 27 and thus supply the circuit with said pulses. Lamps 21, being joined in series, are understandably ignited in a sequential manner. That is, in the linear patterns illustrated in FIG. 2 for each of the described regions, the lamp (A-1) to the upper left in region A is flashed first. Thereafter, the lamp to its immediate right is then ignited and so on. After all of the lamps in region A are flashed, the lamps in region B are also sequentially ignited in a one-at-a-time manner. With the circuit arrangement depicted in FIG. 2, the first lamp (B-1) in region B to be fired will be that lamp located to the lower right (or immediately below the last lamp fired in region A). Thereafter, the lamp to its immediate left will be fired and so on. Further definition of this mode of operation is provided below.

Subsequent to ignition thereof, each lamp is designed to provide a circuit path of relatively low resistance thereacross such that subsequently applied pulses may pass therethrough to effect ignition of the next, adjoining lamp. This is accomplished by providing a primer material (not shown) within the lamp which bridges the inwardly projecting ends of the lamp's lead-in wires 43 (see e.g., FIG. 7) prior to lamp ignition and leaves a low resistance residue subsequent to said ignition. A suitable primer material for this purpose may comprise a mixture of a powdered metal, oxidizer, and oxides. For example, a mixture of zirconium powder, alkaline earth metal chlorates, barium chromate, and lead oxide can be used. A more specific example of such a primer is described in U.S. Pat. No. 4,128,858 (Sterling et al). Using such materials, the remaining primer residue possessed an average low resistance of only about 100 to about 10,000 ohms subsequent to lamp ignition.

In addition to the aforementioned primer materials and projecting lead-in wires, each lamp 21 of the invention includes a light-transmitting, glass envelope 45 having therein a quantity of a shredded combustible material such as zirconium or hafnium and a suitable combustion supporting atmosphere such as oxygen. In the inverted form, it is understood that the bulk of the fuel droplets formed during burning of the lamp's combustible material will settle in the inverted tip end 47 (FIG. 7) of envelope 45 while the described primer residue will serve to bridge the projecting inner ends of wires 43. Each lamp 21, as stated, is capable of being ignited by the high voltage pulse provided by the described piezoelectric element, which in turn provides an output within the range of about 1,000 to 3,000 volts upon mechanical actuation (e.g., impact) thereof. In each of the lamps of the invention, from about 3.0 to about 6.0 milligrams of combustible was used. In addition, the internal envelope pressure of the combustion supporting oxygen was established within the range of about 10 to about 15 atmospheres. Each of the lamp's lead-in wires 43 was bent at approximately 90 degrees prior to positioning on base 31. The preferred material for envelope 45 is a soft glass, several varieties of which are known in the art. One particular example is a potash soda lead glass sold by the assignee of the invention under the product designation SG 10. Each of the lead-in wires is preferably comprised of a nickel-iron alloy, one preferred example sold under the tradename Niron.

Each of the above lamps is defined as being subminiature; that is, each possesses an internal volume (of the envelope) within the range of only about 0.02 cubic centimeters to about 0.08 cubic centimeters. Using the above levels of combustible and internal pressures, each of these extremely small lamps was capable of providing a total output of between 800 and 1600 lumen-seconds, or approximately from 18 to 36 percent of the output (typically 4500 lumen-seconds) provided by the lamps utilized in today's "flip-flash" products. This singular output level is more than adequate to satisfy the requirements of many of today's higher speed (e.g., ASA 400) films. Dimensionwise, the glass envelopes of the lamps as described each had an overall length of only about 0.5 inch long and an outside diameter within the range of about 0.165 inch to about 0.180 inch. The preferred wall thickness for each envelope was only about 0.025 inch. It is understood with regard to the invention that the described outputs for each lamp can also be increased by the addition of a suitable reflecting coating (described below) or individual reflector members.

The invention, as stated above, is capable of operating with substantially greater efficiency than the aforedescribed known multilamp units, as well as many other of the percussive variety. By the term efficiency with regard to the products described herein is meant the individual lamp output (in lumen-seconds) per total package volume allocated for each lamp. The earlier 8-lamp "flip-flash" devices were capable of producing about 4500 lumen-seconds per flash from a package possessing a total volume of about 3.84 cubic inches. Accordingly, the volume allocated in the package for each lamp was only about 0.480 cubic inches. The unit's efficiency was therefore only about 9375 lumen-seconds per allocated lamp volume for the 8-lamp device. The described 10-lamp "flip-flash" units, each producing 4500 lumen-seconds in a package of similar dimension (3.84 cubic inches), possess an efficiency of only about 11,718 lumen-seconds per volume allocated for each lamp. The aforementioned 10-lamp "flash bar" units possess a total package volume of about 2.94 cubic inches with each lamp providing an extremely high output of 8000 lumen-seconds. The result is a lamp output of about 27,000 lumen-seconds per allocated lamp volume in the package.

In striking comparison, the total package volume of the instant invention is only about 0.25 to about 0.38 cubic inches, with each of the ten closely spaced subminiature lamps producing from about 800 to 1600 lumen-seconds. Thus, a total of only about 0.025 to about 0.038 cubic inches is provided for each lamp. For those lamps providing the lesser output (800 lumen-seconds), the range of efficiency for the invention was from about 21,000 to about 32,000 lumen-seconds per allocated lamp volume per package while efficiencies for the 1600 lumen-second units ranged a remarkably high 42,100 to 64,000 lumen-seconds per allocated lamp volume per package. Utilizing the unique teachings defined herein, the invention is therefore able to provide a package efficiency more than double that of today's currently available electrically-activated photoflash units.

By way of further example, the earlier known percussively-activated multilamp units still sold today under the tradename "Magicube" possessed efficiencies of only about 7200 lumen-seconds per allocated lamp volume per package. The typical "Magicube" product contains only four lamps in a boxlike, transparent housing having a total volume of about 2.49 cubic inches. Each lamp, like those of the "flip-flash" variety, provides an output reaching 4500 lumen-seconds.

The circuitry 27 used in the invention is shown in FIG. 2 as including a plurality of radiant energy-activated disconnect switches 51, each of these members being located adjacent a respective one of the flashlamps 21, excluding not necessarily the last lamp to be fired (for reasons explained below). For example, in FIG. 2, the first switch (S-1) in the circuit is located adjacent the first lamp (A-1) to be fired. Each switch provides a complete circuit to the connecting device's grounding terminal (the right terminal in FIG. 2) during application of the respective ignition pulse to the lamp being fired and is designed for assuring an open circuit subsequent to lamp ignition. Specifically, each switch 51 upon receiving the high intensity radiant energy from the ignited lamp immediately adjacent thereto shrinks to the point where it physically separates. It can thus be seen that the subsequent pulse will reach the next adjoining lamp to be fired via circuit paths 27. This lamp understandably is connected to the grounding terminal through its own disconnect switch 51, which has not yet been activated. Accordingly, it is understood from the above operation that the last lamp in the planar array need not have one of the described switches 51 positioned adjacent thereto.

Figure 3:
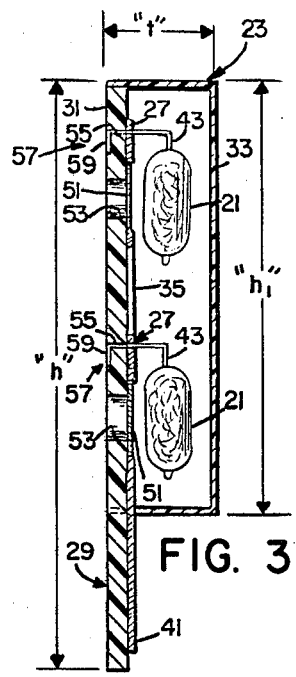
FIG. 3 is an enlarged, side elevational view, in section, of the unit of FIG. 2 in the completed form.

Each switch 51 comprises a thin, longitudinal strip of plastic preferably fabricated from mono- or biaxially-oriented polyethylene, polypropylene, polystyrene, polyester or nylon. The polymeric material itself may be rendered electrically conductive by additives such as carbons or may be rendered surface conductive by provision of a suitable conductive layer thereon. Such a layer may be attained by a vacuum metallization process, electrolysis plating, printing, or a similar coating technique. The piece of switch material may be self-adhesive, such as a tape, and pressure applied to attach both ends of the strip to the circuit board in the manner illustrated. Each strip is located so that it bridges a respective aperture 53 located within base 31. Receipt of radiant energy from the respective, adjacent flash lamp causes a separation near the center of each strip with the two severed ends shrinking back away from each other so as to give the described open circuit which will reliably withstand several thousand volts without leakage. It is noted that the described switches 51, as well as the remaining portions of the circuitry 27 to which the switches are attached, is located on the surface 51 of base 31 immediately adjacent the lamps 21 and therefore within the confines of housing 23. The above-described positioning relationships between circuitry 27 and lamps 21 is also illustrated in FIG. 3. The respective positions of each of the bridged apertures 53 is also illustrated therein. It is also within the scope of the invention to arrange the lamps 21 in parallel, using suitable sequencing means. For example, each lamp (excluding the last to be fired) can be connected to one of the aforedescribed disconnect switches 51 and in addition to a radiant energy activated connect switch of the type described in U.S. Pat No. 4,017,728 (Audesse et al) in much the same manner as the circuit disclosed in this patent. Disconnect switches of this variety typically include silver oxide dispersed in a suitable binder (e.g., polyvinyl resin) and are each designed to exhibit a closed circuit or low resistance between its switch terminals after receiving energy from a respective adjacent lamp in the form of light and/or heat. Originally, the switch possesses a very high resistance approaching an open circuit. The firing order for lamps 21, should this type of circuit be employed, would preferably be the same as that for the embodiment of the invention depicted in FIG. 2. In view of the above, the teachings of U.S. Pat. No. 4,017,728 are incorporated herein by reference.

As illustrated in FIG. 3, each of the lamps 21 is preferably secured to base 31 of housing 23 by passing each of the lead-in wires 43 through respective openings 55 within base 31 such that portions of each wire may be bent back and pressed against the back, opposing surface of the base. To assure a substantially flush back surface, it is preferred to provide a pair of longitudinal, parallel recesses 57 within the back surface and locate the extreme, bent ends 59 of each wire therein. It is understood from the sectional view in FIG. 3 that these recesses pass across the entire width of base 31 such that the upper recess serves to accommodate all of the lead-in wires of lamps of region A while the remaining, lower recess accommodates the extreme ends of the wires of the lamps of region B. Electrical contact between the respective circuit runs 27 and wires 43 is assured by positioning the runs across the respective openings 55 designed to accommodate the lead-in wires. Accordingly, each wire will be located in physical contact with the respective circuit path.

Figure 4:
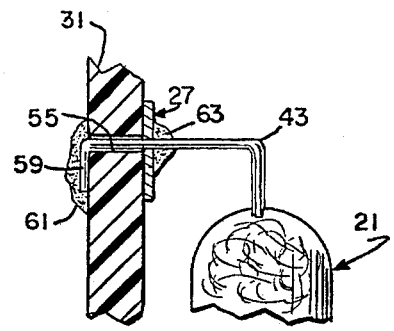
FIGS. 4-6 represent various embodiments for securedly attaching the flashlamps of the invention to the base of the unit's housing and connecting the lead-in wires of the lamps to the unit's lamp-firing circuitry.
Figure 5:
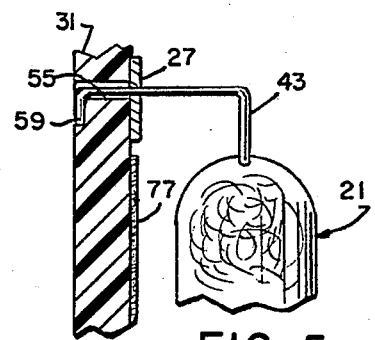
Figure 6:
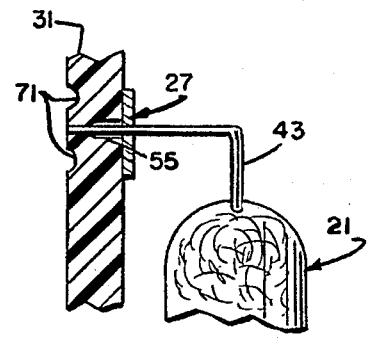

FIGS. 4–6 illustrate various alternative embodiments of techniques for positively securing the lamps of the invention to the base component 31 and for assuring a sound electrical connection between the respective conductive paths of lamp-firing circuitry 27 and the corresponding lead-in wires 43 of each lamp. With particular reference to FIG. 4, each wire passes through a respective opening 55 in base 31 in much the same manner as illustrated in FIG. 3. The extreme projecting end 59 of wire 43 is bent back and pressed against the back surface of base 31 and covered with a suitable epoxy material 61 to assure securement. It is understood in this arrangement that the aforedescribed recesses 57 can also be utilized with the extreme ends 59 located therein and epoxy 61 also provided. Electrical connection between wire 43 and the respective conductive path of circuitry 27 is enhanced by the addition of a conductive paste 63 in the manner illustrated in FIG. 4. One suitable example of such a material is a silver-containing paint especially suited for use in printed circuits and sold under Cat. No. 21-1 by the GC Electronics Co., Rockford, Ill. As a somewhat alternative embodiment to that shown in FIG. 4, it is also within the scope of the invention to terminate the ends of wires 43 substantially flush to the back surface of base 31 and secure the wires within the respective openings 55 using the aforedescribed epoxy. Such an arrangement would clearly eliminate need for the aforementioned bending of the extreme ends as well as the provision of parallel recesses 51.

In FIG. 5, the extending extreme ends 59 of wires 43 are illustrated as being embedded within the back surface of base 31 so as to eliminate the need for the aforementioned recesses 57. This may be accomplished by application of a suitable pressing force in combination with the application of heat in this region of base 31 to permit deformation of the plastic material. The end result, as illustrated in FIG. 5, is substantially flush arrangement along the entire back surface. It is understood of course that the described epoxy and/or conductive paste may also be added at the defined locations.

In FIG. 6, each of the lead-in wires 43 is severed so as to remain substantially flush with the back surface of base 31 and is positively secured within the provided opening 55 by the application of heat and/or pressure to desired surrounding regions of the base's back surface. By way of example, a pair of heated metallic members (not shown) may be forced into the back surface to compress and therefore pinch the plastic in this region against the flush end of wire 43. The end result, as illustrated in FIG. 6, will be a pair of minute indentations 71 about this flush end.

Figure 7:
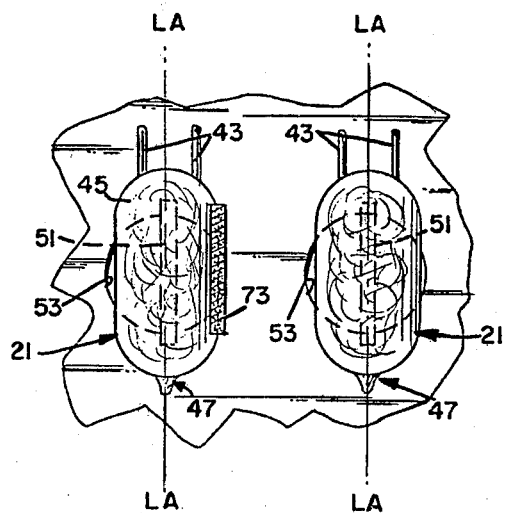
FIG. 7 illustrates a preferred means of preventing sympathetic ignition between two adjacent flash lamps in the invention.

In FIG. 7, there is illustrated in greater detail the preferred positioning relationship between the described disconnect switches 51 and adjacently positioned lamps 21. As shown, each lamp is arranged such that its longitudinal axis LA-LA lies parallel to the longitudinal axis (not shown) of the elongated longitudinal strip 51. This arrangement provides for both the described activation of each strip by the respective flash lamps as well as assuring minimum spacing between lamps and circuit components, an understandably essential requirement to assure the compactness and miniaturization described. For example, the lamps of the unit illustrated in FIGS. 1–3 were spaced apart a distance of only about 0.02 inch. In FIG. 7 there is also illustrated the preferred means for preventing sympathetic ignition between adjacent lamps. Sympathetic ignition is known to occur in flash lamps which are positioned too close together. In summary, the lamp being fired will emit sufficient radiant energy so as to cause subsequent ignition of the adjacent lamp. This phenomena is well known in the art and further description is not believed necessary. To prevent this occurrence, a strip or coating of opaque material 73 is positioned on one side of each lamp so as to substantially prevent emission of the described radiant energy in the direction of the adjacent lamp. It is understood that only the first four lamps to be fired in each region need be provided the described strip of opaque material 73. In a preferred embodiment, material 73 was comprised of an adhesive-backed aluminum foil. Yet another acceptable means for preventing sympathetic ignition would be to provide a plurality of opaque shielding members attached to the front surface 35 of base 31 and located between adjacent lamps. Such materials could be comprised of plastic (e.g., polystyrene) covered with a suitable coating of the described material.

To enhance emission of the radiant energy provided by each of the lamps 21, it is preferred to provide a coating of reflective material (e.g., white paint) on the portions of the forward surface 35 of base 31 not containing the described lamp-firing circuitry 27. Such a coating is illustrated in FIG. 5 by the numeral 77 and is preferably of flat paint to provide diffuse rather than specular reflectance. It is also within the scope of the invention to provide individual reflective components (e.g., formed plastic members coated with a suitable diffusely reflective coating such as the aforementioned flat white paint) within housing 23 and adjacent each respective lamp 21. Such reflective members would necessarily include apertures therein to permit passage of energy from each lamp to the respective disconnect switches 51. It is even further within the scope of the invention to include within base 31 a white or similar pigment material (e.g., titanium dioxide) to provide this feature.

While there have been shown and described what are at present considered the preferred embodiments of the invention, it will be obvious to those skilled in the art that various changes and modifications may be made therein without departing from the scope of the invention as defined by the appended claims.

What is claimed is:

1. A miniature photoflash unit for being electrically activated when electrically connected to a power source associated with a camera, said unit comprising:
a small, substantially planar housing including an electrically insulative base and a light-transmitting cover secured to or forming a part of said base;
lamp-firing circuitry located within said housing and positioned on a first surface of said base;
first and second pluralities of subminiature, electrically-activated flash lamps each including a glass envelope and a pair of lead-in wires projecting from one end of said envelope, said lead-in wires passing through said base to a second surface opposite said first surface and being secured to said base and electrically connected to said lamp-firing circuitry on said first surface, said flash lamps located within said housing in a substantially planar array such that said envelopes are positioned adjacent said first surface of said base, said first plurality of lamps oriented in a linear pattern and occupying a first region within said housing, said second plurality of lamps oriented in a linear pattern and occupying a second region within said housing separate from said first region, said lamp-firing circuitry selectively igniting said flash lamps in both of said regions such that said lamps in said first region will be sequentially ignited prior to said lamps in said second region; and
a singular mounting device secured to said housing or forming a part thereof for electrically connecting said photoflash unit to said power source associated with said camera when said mounting device is connected to said power source, said device including first and second electrical terminals positioned on a surface of said device and electrically joined to said lamp-firing circuitry for supplying ignition pulses to said circuitry to effect said selective ignition of said flash lamps in response to receipt of said pulses from said power source, said second region of said flash lamps located between said mounting device and said first region of flash lamps.

2. The photoflash unit according to claim 1 wherein said linear patterns are substantially parallel.

3. The photoflash unit according to claim 1 wherein all of said flash lamps are electrically joined in a series relationship.

4. The photoflash unit according to claim 3 wherein said mounting device comprises a tabular member extending from said insulative base of said planar housing in a first direction, each of said flash lamps in each of said first and second regions being oriented in an inverted position with respect to said mounting device such that each of said ends of said envelopes having said lead-in wires projecting therefrom face in a second direction directy opposite said first direction of said tabular member.

5. The photoflash unit according to claim 4 wherein each of said flash lamps includes a primer material within said envelope, said primer material bridging said lead-in wires and providing a low resistance residue subsequent to ignition of said flash lamp such that said flash lamp possesses a relatively low resistance subsequent to ignition thereof.

6. The photoflash unit according to claim 3 wherein said lamp-firing circuitry includes a plurality of radiant energy-activated disconnect switches, each of said switches positioned adjacent a respective one of said flash lamps excluding not necessarily the last flash lamp in said second region to be ignited for providing an open circuit thereacross upon receipt of radiant energy from said flash lamp.

7. The photoflash unit according to claim 6 wherein each of said disconnect switches comprises a longitudinal strip, the longitudinal axis of each of said strips being parallel to the longitudinal axis of each respective flash lamp.

8. The photoflash unit according to claim 1 wherein said second surface of said base includes first and second substantially parallel elongated recesses therein, portions of said lead-in wires from said first plurality of flash lamps in said first region extending beyond said second surface of said base and occupying said first recess, and portions of said lead-in wires from said second plurality of flash lamps in said second region extending beyond said second surface and occupying said second recess.

9. The photoflash unit according to claim 1 wherein portions of each of said lead-in wires from said flash lamps extend beyond said second surface of said base and are bent back against said second surface.

10. The photoflash unit according to claim 9 wherein said bent, extending portions of said lead-in wires are embedded within said second surface of said base.

11. The photoflash unit according to claim 1 wherein said mounting device is a tabular member secured to or forming a part of said base of said housing.

12. The photoflash unit according to claim 1 wherein the number of flash lamps in each of said first and second separate regions is five.

13. The photoflash unit according to claim 1 further including means to prevent sympathetic ignition of adjacent flash lamps.

14. The photoflash unit according to claim 13 wherein said means to prevent sympathetic ignition comprises a strip or coating of opaque material located on one side of each of said flash lamps excluding not necessarily the last flash lamp in each of said separate regions to be ignited.

15. The photoflash unit according to claim 1 further including means for reflecting portions of the light emitted by each of said flash lamps upon ignition thereof toward said light-transmitting cover.

16. The photoflash unit according to claim 15 wherein said reflecting means comprises a reflective coating located on said first surface of said base adjacent each of said flash lamps.

17. The photoflash unit according to claim 1 wherein the lamp output per unit volume allocated per lamp is within the range of about 21,000 to about 64,000 lumen-seconds.

* * * * *